United States Patent
Miller

(10) Patent No.: US 10,924,527 B2
(45) Date of Patent: Feb. 16, 2021

(54) DYNAMIC WORKFLOW-BASED COMPOSITE WEB SERVICE SYSTEM AND METHOD

(71) Applicant: Tranztec Solutions, Inc, Perrysburg, OH (US)

(72) Inventor: Toby W. Miller, Perrysburg, OH (US)

(73) Assignee: TRANZTEC SOLUTIONS, INC., Perrysburg, OH (US)

( * ) Notice: Subject to any disclaimer, the term of this patent is extended or adjusted under 35 U.S.C. 154(b) by 1010 days.

(21) Appl. No.: 14/301,881

(22) Filed: Jun. 11, 2014

(65) Prior Publication Data
US 2015/0365460 A1    Dec. 17, 2015

(51) Int. Cl.
*H04L 29/08*    (2006.01)
*G06F 16/958*    (2019.01)

(52) U.S. Cl.
CPC ............ *H04L 67/02* (2013.01); *G06F 16/958* (2019.01)

(58) Field of Classification Search
CPC ....................................................... H04L 67/02
See application file for complete search history.

(56) References Cited

U.S. PATENT DOCUMENTS

| | | | | |
|---|---|---|---|---|
| 9,641,592 | B2* | 5/2017 | Thompson | H04L 29/08 |
| 2010/0257587 | A1* | 10/2010 | Chazin | H04L 63/105 |
| | | | | 726/3 |
| 2012/0179503 | A1* | 7/2012 | Chalana | G06Q 10/06 |
| | | | | 705/7.14 |
| 2013/0159048 | A1* | 6/2013 | Kim | G06Q 10/0633 |
| | | | | 705/7.27 |

* cited by examiner

*Primary Examiner* — Viet D Vu
(74) *Attorney, Agent, or Firm* — Michael E. Dockins; Shumaker, Loop & Kendrick, LLP

(57) ABSTRACT

A dynamic workflow-based composite web service system and method for the creation and definition of a web service, its properties, methods, and functions through the combination of an event trigger which defines the web service endpoint, actor classes which defines the service's properties and metadata, and a workflow which defines its methods and functions. The dynamic workflow-based composite web service system and method generally includes one or more web service endpoints (the URL where the service can be accessed by a client application), an event trigger defined for each endpoint, actors which define the properties and metadata of the service, and a workflow which receives input from the endpoint, returns the result of the process, and defines the web service functions and methods.

20 Claims, 2 Drawing Sheets

DYNAMIC WORKFLOW-BASED COMPOSITE WEB SERVICE SYSTEM AND METHOD

FIELD OF THE INVENTION

The invention relates generally to web services and more specifically it relates to a dynamic workflow-based composite web service system and method for the creation and definition of a web service, its properties, methods, and functions through the combination of an event trigger which defines the web service endpoint, actor classes which defines the service's properties and metadata, and a workflow which defines its methods and functions.

BACKGROUND OF THE INVENTION

This section provides background information related to the present disclosure which is not necessarily prior art.

A web service is a method of communication between two electronic devices over a network. It is a software function provided at a network address over the web with the service always on as in the concept of utility computing. The World Wide Web Consortium (W3C) is an international community that develops open standards to ensure the long-term growth of the Web. W3C defines a web service as a software system designed to support interoperable machine-to-machine interaction over a network. It has an interface described in a machine-processable format (specifically WSDL). Other systems interact with the web service in a manner prescribed by its description using SOAP messages, typically conveyed using HTTP with an XML serialization in conjunction with other Web-related standards.

The W3C identifies two major classes of web services: REST-compliant web services and Arbitrary web services. REST-compliant web services have the primary purpose of manipulating XML representations of Web resources using a uniform set of stateless operations. Arbitrary web services may expose an arbitrary set of operations.

Many organizations use multiple software systems for management. Different software systems often need to exchange data with each other, and a web service is a method of communication that allows two software systems to exchange this data over the Internet. The software system that requests data is called a service requester, whereas the software system that would process the request and provide the data is called a service provider.

Different software might be built using different programming languages, and hence there is a need for a method of data exchange that doesn't depend upon a particular programming language. Most types of software can, however, interpret XML tags. Thus, web services can use XML files for data exchange.

Rules for communication between different systems need to be defined, such as:
How one system can request data from another system.
Which specific parameters are needed in the data request.
What would be the structure of the data produced. Normally, data is exchanged in XML files, and the structure of the XML file is validated against an .xsd file.
What error messages to display when a certain rule for communication is not observed, to make troubleshooting easier All of these rules for communication are defined in a file called WSDL (Web Services Description Language), which has the extension .wsdl. A directory called UDDI (Universal Description, Discovery and Integration) defines which software system should be contacted for which type of data. So when one software system needs one particular report/data, it would go to the UDDI and find out which other system it can contact for receiving that data. Once the software system finds out which other system it should contact, it would then contact that system using a special protocol called SOAP (Simple Object Access Protocol). The service provider system would first of all validate the data request by referring to the WSDL file, and then process the request and send the data under the SOAP protocol.

BRIEF SUMMARY OF THE INVENTION

The invention generally relates to a web service which includes one or more web service endpoints (the URL where the service can be accessed by a client application), an event trigger defined for each endpoint, actors which define the properties and metadata of the service, and a workflow which receives input from the endpoint, returns the result of the process, and defines the web service functions and methods.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a dynamic workflow-based composite web service system and method for the creation and definition of a web service, its properties, methods, and functions through the combination of an event trigger which defines the web service endpoint, actor classes which defines the service's properties and metadata, and a workflow which defines its methods and functions.

Another object is to provide a Dynamic Workflow-based Composite Web Service System and Method that dynamically defines a complete web service complete with its end points, and the functions, methods, properties, and attributes for each endpoint.

Another object is to provide a Dynamic Workflow-based Composite Web Service System and Method that may contain multiple endpoints each defined by an event trigger that fires when that endpoint is called via the unique URL that is specified for that endpoint.

Another object is to provide a Dynamic Workflow-based Composite Web Service System and Method that handles multiple incoming requests to a given endpoint by the trigger launching each request as its own processing thread.

Another object is to provide a Dynamic Workflow-based Composite Web Service System and Method that further defines each endpoint by a workflow that is attached to that endpoint which provides the functions, methods, properties, and attributes for that endpoint.

Another object is to provide a Dynamic Workflow-based Composite Web Service System and Method that allows for web service parameters to be passed into an end point and ultimately its attached workflow for the specification of search criteria, update criteria, or other data required for the proper function of the endpoint workflow.

Another object is to provide a Dynamic Workflow-based Composite Web Service System and Method that has actors that define the data upon which the various endpoint workflows operate and allows for those actors to be shared amongst and operated on by any of the end point workflows within the system to provide unified functionality.

Another object is to provide a Dynamic Workflow-based Composite Web Service System and Method that returns output from the execution of the endpoint workflow as a result to the calling client application.

The method for providing dynamic workflow-based composite web services according to the invention comprises the steps of: providing a management system for receiving an input data request from a remote client application, the request including a request URL; providing a plurality of web service endpoints, each of the endpoints including a trigger with an associated endpoint URL; providing a plurality of workflows, each workflow associated with at least one of the endpoints and including activities; providing a plurality of actors, each actor associated with at least one of the workflows; triggering a one of the triggers having the endpoint URL corresponding to the request URL to load the associated workflow; executing the loaded associated workflow using the associated actor to generate and send to the one trigger an output data representing serialized actor properties; and sending the output data from the one trigger to the client application.

The management system for providing dynamic workflow-based composite web services according to the invention comprises: an input for receiving an input data request from a remote client application, the request including a request URL; a webservice manager connected to the input and providing a plurality of web service endpoints, each of the endpoints including a trigger with an associated endpoint URL, the webservice manager providing a plurality of workflows, each of the workflows associated with at least one of the endpoints and including activities, the webservice manager providing a plurality of actors, each of the actors associated with at least one of the workflows, the webservice manager triggering a one of the triggers having the endpoint URL corresponding to the request URL to load the associated workflow, the webservice manager executing the loaded associated workflow using the associated actor to generate and send to the one trigger an output data representing serialized actor properties; and an output connected to the webservice manager for sending the output data from the one trigger to the client application.

Other objects and advantages of the invention will become obvious to the reader and it is intended that these objects and advantages are within the scope of the invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE SEVERAL VIEWS OF THE DRAWING

Various other objects, features and attendant advantages of the invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

A. Overview

Figure 1:
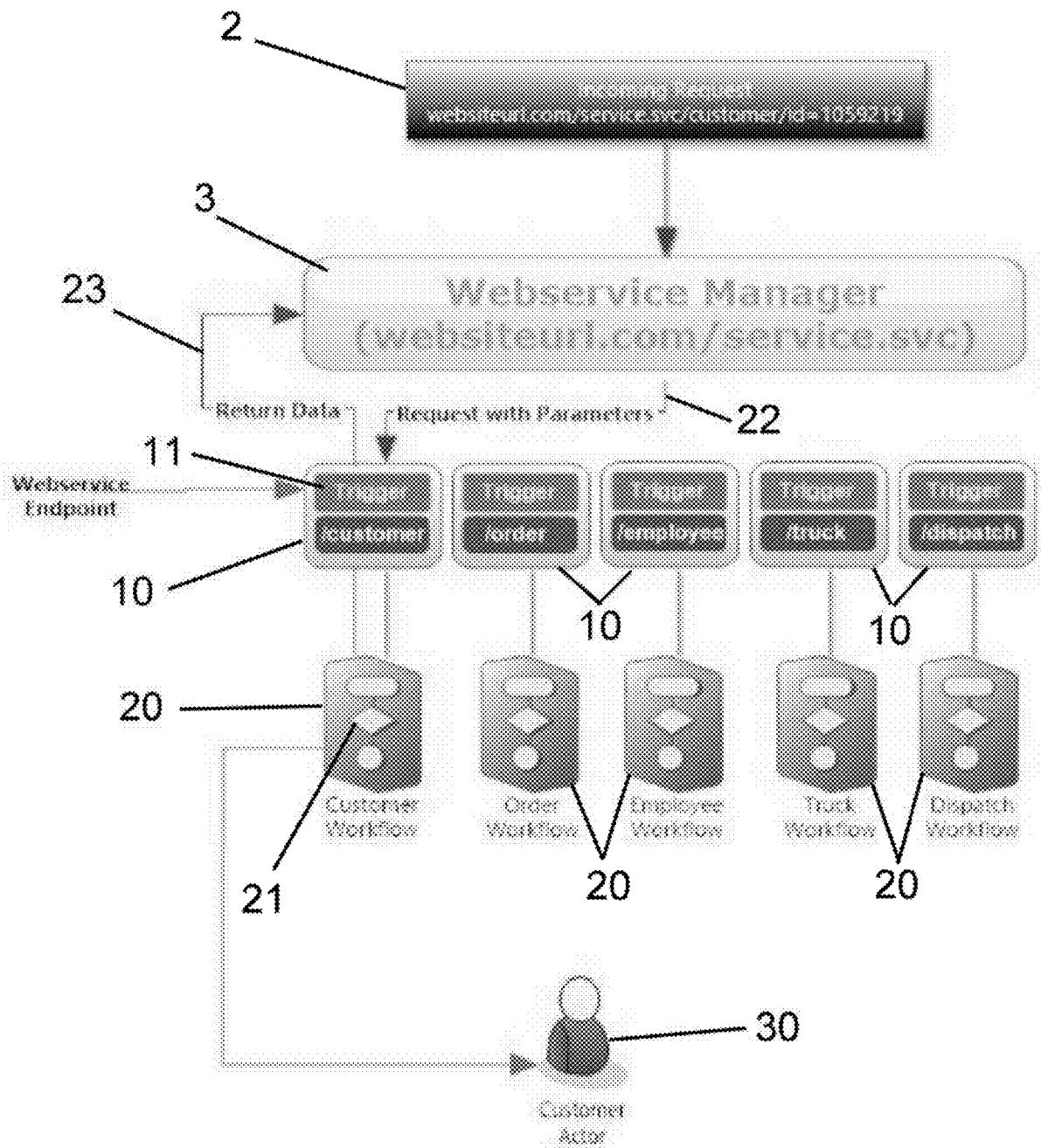
FIG. 1 is a block diagram illustrating an overall view of the system according to the invention.

Turning now descriptively to the drawings, in which similar reference characters denote similar elements and steps throughout the several views, FIG. 1 illustrates one or more web service endpoints 10 (the URL where the service can be accessed by a client application), an event trigger 11 defined for each endpoint, actors 30 which define the properties and metadata of the service, and a workflow 20 which receives an input from the endpoint, returns the result of the process, and defines the web service functions and methods.

B. Web Service Endpoint

Each web service endpoint 10 is the URL where the service may be accessed or called by the client application. The web service endpoint 10 is defined by the trigger 11 which is fired when the URL is accessed and provides access to and return data from its associated workflow 20. In FIG. 1, the triggers 11 and the associated workflows 20 are identified by the labels "Customer", "Order", "Employee", "Truck" and "Dispatch" that are related to the transportation industry. These labels are examples only and the system and method according to the invention can be utilized for any industry.

The web service endpoint 10 defines a URL that may be called by any external client application 2 such that when that call is received by a Webservice Manager 3 it triggers an event that receives input data 22 including any input parameters from the client application, executes the associated endpoint workflow 20 passing it the input data, and receives back the output data 23 of that workflow for return to the client application 2 as a response. The Webservice Manager 3 can be a server connected to the Internet and including at least one processor. A computer program product comprising at least one computer program means for performing the method for providing dynamic workflow-based composite web services according to the invention wherein at least one step of the method is performed when the computer program means is loaded into at least one processor of the management system. A non-transitory computer-readable data storage device can comprise the computer program product.

C. Endpoint Workflow

The endpoint workflow 20 is a workflow that is attached to the endpoint 10 and is executed when the endpoint trigger 11 receives an incoming request from a client application 2 along with any specified parameters.

A workflow 20 that is attached to a defined endpoint 10 is executed when an incoming input data request 22 is made that fires that endpoint's event trigger 11. Workflow is defined as a series of distinct programming steps or phases written in any programming language where each step is modeled as Activity 21. Activities 21 are assembled visually into logical steps to encapsulate programming functionality into the larger workflow to define the totality of its functionality including input, output, and work performed within its execution.

D. Actor

The actor 30 is a standardized data definition that is shared among the endpoint workflows 20 and provides a standard method for the various endpoint workflows to interact with each other using a common data layer.

Actors 30 provide a data definition layer that is shared among and operated on by the endpoint workflows 20 to carry out their step-by-step activities 21. Actors 30 provide a standard method for endpoint workflows 20 to interact with each other using a common data layer. Actors 30 also define the data output, properties, and attributes of the external web service.

E. Connections of Main Elements and Sub-Elements of the System

Event Triggers 11 define each endpoint 10 of the web service and connect the endpoint to a specific workflow 20. The workflow 20 leverages and connects to the actor 30 to define the service's properties and metadata. The workflow 20 accepts input from the event trigger 11, and executes its step-by-step instructions defined by activities producing a result to be returned as output data 23 to the client application 2 that accessed the given endpoint.

F. Operation of Preferred Embodiment

A standard web service is a method of communication between two electronic devices over a network. It is a software function provided at a network address over the web with the service always on as in the concept of utility computing. The software function for the typical web service is written with commonly available programming languages and is compiled into a fixed form that cannot be changed without additional programming effort.

Utilizing the system and method for a Dynamic Workflow-based Composite Web Service according to the invention, a web service can be defined dynamically by leveraging easy to use workflow and activity components without the need for statically compiling the web service or fixing its definition.

Figure 2:
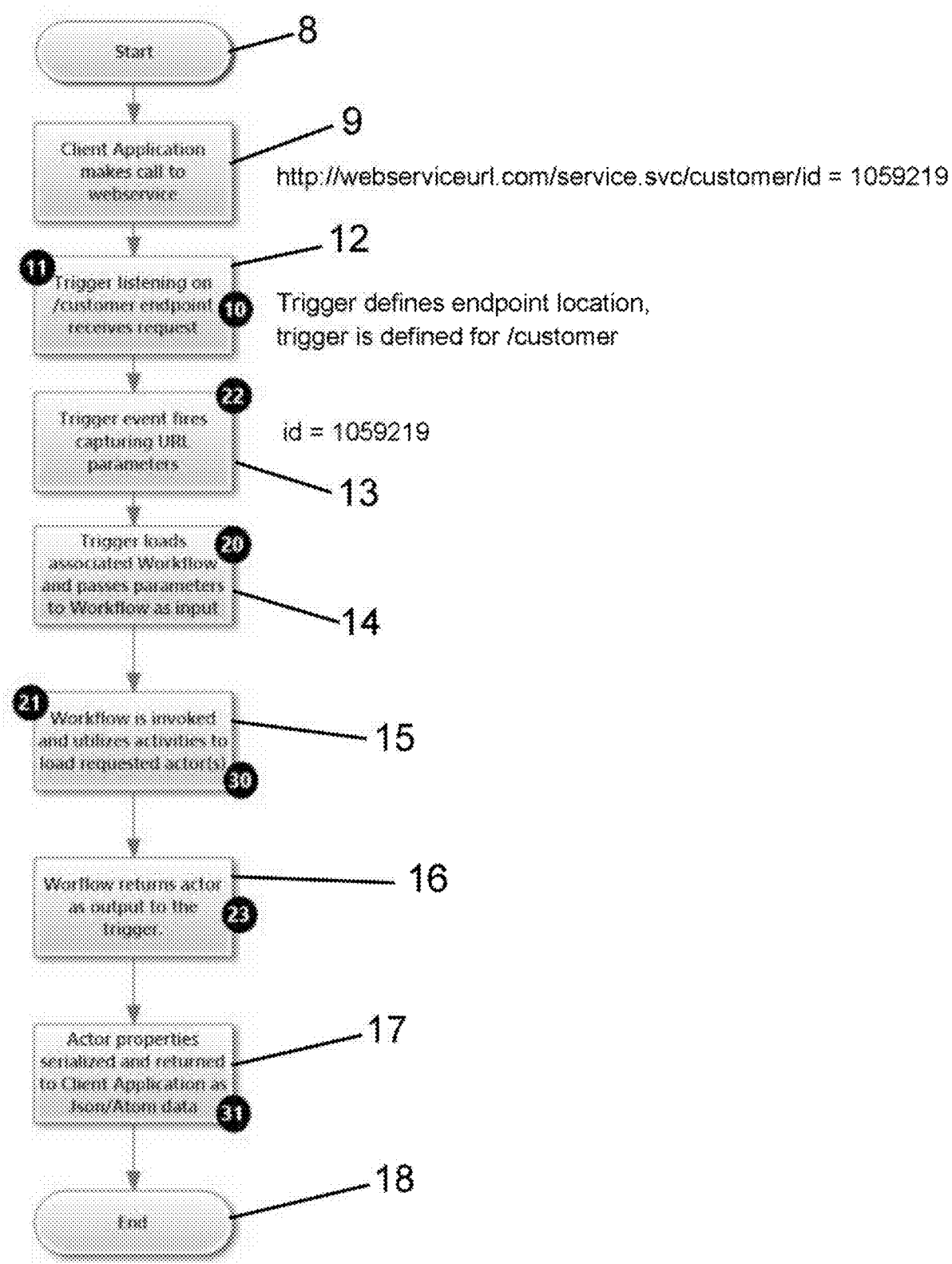
FIG. 2 is a flow diagram illustrating the method of processing of a single request according to the invention.

Each web service endpoint 10 is defined by creating an event trigger 11 that encapsulates its own endpoint URL address and defines which workflow 20 to execute when the event occurs. FIG. 2 is a flow diagram of the method by which the Dynamic Workflow-based Composite Web Service processes a single request from the client application 2 shown in FIG. 1. Referring to FIG. 2, the method according to the invention begins at "Start" 8. In a step 9, the client application 2 accesses the URL through the Webservice Manager 3 by sending a request including a URL and any input parameters. An example of the URL is shown next to the step 9.

In a step 12, the trigger 11 that is listening on the endpoint URL corresponding to the request URL receives the request and is fired in a step 13. When fired, the trigger 11 gathers the incoming parameter(s) in the input data 22 from the client application 2, if any, and then executes its defined workflow passing the parameter data to the workflow 20 as input in a step 14. The parameter data may include a customer identification (id), or any other identifier or filter criteria. In a step 15, the workflow 20 executes its step-by-step instructions in the form of workflow activities 21, accesses or creates actors 30, calls other workflows, accesses other systems, and ultimately returns an output data result 23 at the end of execution in a step 16. The output data 23 returned from the workflow 20, including actor properties 31 serialized, is then returned to the original calling client application 2 in a step 17. The output data 23 can be in the form of JSON data, or Atom data, or any other HTML formatted data. JSON (JavaScript Object Notation) is an open standard format alternative to XML and Atom is a format in an XML language used for web feeds. The processing of the single request is terminated at "End" 18.

The logic behind the Dynamic Workflow-based Composite Webservice may be changed, extended, or replaced at any time by simply altering the workflow attached to a specific web service endpoint. This can be done without needing to shut down or statically re-compile the web service. Further, additional endpoints may be easily created by creating a workflow for each new endpoint. The web service, its endpoints, and the data that is returned (via the Actors) are all dynamically defined by the workflow itself.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

In accordance with the provisions of the patent statutes, the invention has been described in what is considered to represent its preferred embodiment. However, it should be noted that the invention can be practiced otherwise than as specifically illustrated and described without departing from its spirit or scope.

What is claimed is:

1. A method for providing dynamic workflow-based composite web services comprising the steps of:
    providing a management system for receiving an input data request from at least one of a plurality of remote client applications, the request including a request URL;
    providing a plurality of web service endpoints, each of the endpoints including a trigger with an associated endpoint URL;
    providing a plurality of workflows, each workflow associated with at least one of the endpoints and including a plurality of activities;
    providing a plurality of actors, each actor being a standardized data definition shared among the plurality of workflows, each actor providing a standard method for the plurality of workflows to interact with each other using a common data layer, wherein each actor is paired with the plurality of activities to allow the paired actor to automatically communicate with the at least one of the plurality of remote client applications, wherein each client application is different;

triggering one of the triggers having the endpoint URL corresponding to the request URL to load the associated workflow;

executing the loaded associated workflow using the associated actor to generate and send to the one trigger an output data representing serialized actor properties; and sending the output data from the one trigger to the client application.

2. The method according to claim 1 wherein the request includes parameter data, the one trigger gathers the parameter data and inputs the parameter data to the loaded associated workflow for processing during the execution.

3. The method according to claim 2 wherein the parameter data includes a customer identification, or any other actor identification or filter criteria.

4. The method according to claim 1 including generating the output as either JSON, Atom or any other HTML data format.

5. The method according to claim 1 wherein the workflow activities are step-by-step instructions performed during the execution of the loaded associated workflow.

6. The method according to claim 5 wherein the loaded associated workflow calls at least another of the workflows during the execution.

7. The method according to claim 1 including receiving the request from the remote client application at the management system over the Internet.

8. A computer program product comprising at least one computer program means for performing the method according to claim 1 for providing dynamic workflow-based composite web services wherein at least one step of the method is performed when the computer program means is loaded into at least one processor of the management system.

9. A non-transitory computer-readable data storage device comprising the computer program product according to claim 8.

10. A management system for providing dynamic workflow-based composite web services comprises:

an input for receiving an input data request from at least one of a plurality of remote client applications, the request including a request URL;

a webservice manager connected to the input and providing a plurality of web service endpoints, each of the endpoints including a trigger with an associated endpoint URL, the webservice manager providing a plurality of workflows, each of the workflows associated with at least one of the endpoints and including a plurality of activities, the webservice manager providing a plurality of actors, each of the actors being a standardized data definition shared among the plurality of workflows, each of the actors providing a standard method for the plurality of workflows to interact with each other using a common data layer, wherein each actor is paired with the plurality of activities to allow the paired actor to automatically communicate with the at least one of the plurality of remote client applications, wherein each client application is different, the webservice manager triggering a one of the triggers having the endpoint URL corresponding to the request URL to load the associated workflow, the webservice manager executing the loaded associated workflow using the associated actor to generate and send to the one trigger an output data representing serialized actor properties; and an output connected to the webservice manager for sending the output data from the one trigger to the client application.

11. The management system according to claim 10 wherein the request includes parameter data, the one trigger gathers the parameter data and inputs the parameter data to the loaded associated workflow for processing during the execution.

12. The management system according to claim 11 wherein the parameter data includes a customer identification or any other actor identification or filter criteria.

13. The management system according to claim 12 including generating the output as JSON, Atom or any other HTML data format.

14. The management system according to claim 10 wherein the workflow activities are step-by-step instructions performed during the execution of the loaded associated workflow.

15. The management system according to claim 14 wherein the loaded associated workflow calls at least another of the workflows during the execution.

16. The management system according to claim 10 including receiving the input data request from the remote client application at the input over the Internet.

17. The method according to claim 1 wherein the output data represents serialized actor properties and metadata of the dynamic workflow-based composite web services.

18. The method according to claim 1 further comprising:

receiving another input data request from another remote client application, the request including another request URL;

triggering another one of the triggers having the endpoint URL corresponding to the another request URL to load the associated workflow;

executing the loaded associated workflow using the associated actor to generate and send to the another trigger another output data representing serialized actor properties; and sending the another output data from the another trigger to another client application.

19. The method according to claim 1 wherein the management system is operable to receive multiple input data requests from a plurality of remote client applications, each request including a request URL.

20. The method according to claim 1 wherein the multiple input data requests from the plurality of remote client applications each include a request to the same request URL.

* * * * *